US011817025B1

(12) United States Patent
Wang et al.

(10) Patent No.: US 11,817,025 B1
(45) Date of Patent: Nov. 14, 2023

(54) ELECTRONIC DEVICES HAVING HOUSINGS WITH IMAGE TRANSPORT LAYERS

(71) Applicant: Apple Inc., Cupertino, CA (US)

(72) Inventors: Ying-Chih Wang, Sunnyvale, CA (US); Michael J. Brown, Campbell, CA (US); Michael B. Wittenberg, San Francisco, CA (US); Paul C. Kelley, San Francisco, CA (US); Rasamy Phouthavong, San Jose, CA (US); Tyler R. Kakuda, Stockton, CA (US); Jean-Pierre S. Guillou, Los Gatos, CA (US); Marwan Rammah, San Francisco, CA (US); Richard H. Dinh, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 16/682,346

(22) Filed: Nov. 13, 2019

Related U.S. Application Data

(60) Provisional application No. 62/760,526, filed on Nov. 13, 2018.

(51) Int. Cl.
*F21V 8/00* (2006.01)
*G09F 9/30* (2006.01)
(Continued)

(52) U.S. Cl.
CPC ............. *G09G 3/20* (2013.01); *G02B 6/0006* (2013.01); *G02B 6/0008* (2013.01); *G09F 9/301* (2013.01); *G02B 2006/12111* (2013.01)

(58) Field of Classification Search
CPC .......... G09G 3/20; G02B 6/0008; G09F 9/301
See application file for complete search history.

(56) References Cited

U.S. PATENT DOCUMENTS 4,349,817 A 9/1982 Hoffman et al.
4,375,908 A * 3/1983 Baldwin .................. G02B 6/06 385/119

(Continued)

FOREIGN PATENT DOCUMENTS

KR 20180034832 A 4/2018
WO WO-2018014036 A1 * 1/2018 ........... G02B 27/095

*Primary Examiner* — Amy Onyekaba
(74) *Attorney, Agent, or Firm* — Treyz Law Group, P.C.; G. Victor Treyz; David K. Cole

(57) ABSTRACT

An electronic device may have pixels. The pixels may form one or more displays. The displays may be flexible organic light-emitting diode displays or other displays. The electronic device may have first and second display layers that face away from each other and display images in different directions. Image transport layers may overlap the display layers and may have curved edges that overlap a sidewall portion of the electronic device. Image transport layers receive images at input surfaces and transport the received images to corresponding output surfaces. Image transport layers may be provided with hemispherical shapes and other shapes having output surfaces of compound curvature. A folding device may have first and second displays that are overlapped by respective first and second image transport layers that join over a hinge to block the hinge from view. A wristwatch device may have links or other structures with an image transport layer.

17 Claims, 18 Drawing Sheets

(51) Int. Cl.
*G02B 6/12* (2006.01)
*G09G 3/20* (2006.01)

(56) References Cited

U.S. PATENT DOCUMENTS 4,534,813 A 8/1985 Williamson et al.
5,127,078 A * 6/1992 Terry ...................... G02B 6/08 385/116
5,329,386 A 7/1994 Birecki et al.
5,353,133 A * 10/1994 Bernkopf .......... G02F 1/133621 349/10
5,465,315 A * 11/1995 Sakai ..................... G09F 9/305 385/116
5,502,457 A 3/1996 Sakai et al.
5,659,378 A 8/1997 Gessel
5,886,822 A * 3/1999 Spitzer ............... G02B 27/0172 359/630
6,046,730 A 4/2000 Bowen et al.
6,407,785 B1 6/2002 Yamazaki
6,418,267 B1 * 7/2002 Lowry ..................... G02B 6/06 385/115
6,467,922 B1 10/2002 Blanc et al.
6,680,761 B1 1/2004 Greene et al.
6,845,190 B1 1/2005 Smithwick et al.
7,228,051 B2 6/2007 Cok et al.
7,450,310 B2 * 11/2008 McGuire ............ G02B 27/0172 359/630
7,515,406 B2 * 4/2009 Kee ...................... G06F 1/1616 345/1.1
7,542,209 B2 * 6/2009 McGuire, Jr. ...... G02B 27/0081 359/630
7,742,120 B2 * 6/2010 Bayley ................ G03B 21/006 349/58
7,823,309 B2 11/2010 Albenda
7,856,161 B2 12/2010 Tabor
8,045,270 B2 10/2011 Shin et al.
8,572,893 B2 * 11/2013 Watanabe ............ G02B 5/0215 349/73
8,723,824 B2 5/2014 Myers et al.
8,824,779 B1 * 9/2014 Smyth ...................... G06T 7/73 382/117
8,836,880 B2 * 9/2014 Takama ............ G02F 1/133526 349/57
8,907,863 B2 * 12/2014 Li ....................... G02F 1/13336 345/1.1
8,976,324 B2 * 3/2015 Yang ................. G02F 1/133524 349/158
9,146,590 B2 * 9/2015 Myers ................... G06F 1/1626
9,268,068 B2 * 2/2016 Lee ........................ G02B 5/286
9,312,517 B2 * 4/2016 Drzaic ................. H10K 50/865
9,342,105 B2 * 5/2016 Choi ....................... G06F 1/182
9,509,939 B2 * 11/2016 Henion .................. G03B 21/62
9,591,765 B2 * 3/2017 Kim ...................... G06F 1/1652
9,755,004 B2 * 9/2017 Shieh ................... H10K 50/865
9,818,725 B2 * 11/2017 Bower ................ H01L 25/0655
9,907,193 B2 * 2/2018 Lee .......................... H05K 5/03
9,993,201 B2 * 6/2018 Kim ..................... A61B 5/0075
10,048,532 B2 8/2018 Powell et al.
10,052,831 B2 * 8/2018 Welker ............. B29D 11/00682
10,185,064 B2 * 1/2019 Powell .................. G06F 1/1637
10,579,157 B1 * 3/2020 Wilson .................... G06F 3/023
10,681,195 B2 * 6/2020 Kwak ................... G06F 1/1647
10,687,592 B2 * 6/2020 Weber .................... G02B 6/001
2004/0051944 A1 * 3/2004 Stark ..................... G06F 1/1641 359/448
2005/0013005 A1 * 1/2005 Rogers ............... G02B 27/0101 359/630
2005/0018309 A1 * 1/2005 McGuire, Jr. ...... G02B 27/0081 359/630
2006/0016448 A1 1/2006 Ho
2006/0119951 A1 * 6/2006 McGuire, Jr. ...... G02B 27/1026 359/630
2006/0250696 A1 * 11/2006 McGuire ............. G02B 27/145 359/630
2006/0250897 A1 * 11/2006 Brewer .................. G04C 17/00 368/82
2006/0251365 A1 * 11/2006 Brewer .................... G02B 6/08 385/116
2007/0097108 A1 * 5/2007 Brewer ................. G06F 1/1615 345/204
2007/0177275 A1 * 8/2007 McGuire, Jr. ...... G02B 27/0172 359/630
2008/0144174 A1 6/2008 Lucente et al.
2008/0186252 A1 8/2008 Li
2009/0173760 A1 * 7/2009 Good .................. A45C 13/001 368/282
2010/0177261 A1 7/2010 Jin et al.
2010/0182405 A1 * 7/2010 Monteiro ................ G02B 6/04 348/45
2010/0238090 A1 9/2010 Pomerantz et al.
2010/0289760 A1 * 11/2010 Jonoshita ............. G06F 1/1647 345/173
2011/0025594 A1 2/2011 Watanabe
2011/0057861 A1 3/2011 Cok et al.
2011/0102300 A1 5/2011 Wood et al.
2011/0102302 A1 * 5/2011 Watanabe ................ G09F 9/30 345/4
2011/0109535 A1 * 5/2011 Watanabe ......... G02F 1/133526 345/87
2011/0242686 A1 * 10/2011 Watanabe ........... G02B 27/024 359/804
2012/0049718 A1 * 3/2012 Watanabe ......... G02F 1/133526 313/110
2012/0218219 A1 8/2012 Rappoport et al.
2013/0081756 A1 4/2013 Franklin et al.
2013/0083080 A1 4/2013 Rappoport et al.
2013/0235560 A1 9/2013 Etienne et al.
2013/0279088 A1 10/2013 Raff et al.
2014/0037257 A1 * 2/2014 Yang ................... G02B 6/0078 385/116
2014/0092028 A1 4/2014 Prest et al.
2014/0092346 A1 4/2014 Yang et al.
2014/0132488 A1 * 5/2014 Kim ..................... G06F 1/1637 345/76
2014/0166867 A1 * 6/2014 Shiu ..................... G01J 1/0271 250/239
2014/0183473 A1 * 7/2014 Lee ...................... G06F 1/1641 257/40
2014/0240985 A1 * 8/2014 Kim .................... H10K 77/111 438/34
2014/0295150 A1 * 10/2014 Bower ............... H01L 51/0097 428/201
2014/0328041 A1 * 11/2014 Rothkopf ............ H05K 5/0217 361/807
2014/0354920 A1 * 12/2014 Jang ................... G02F 1/13336 445/24
2015/0053943 A1 * 2/2015 Cho ...................... H10K 59/40 438/26
2015/0093087 A1 * 4/2015 Wu ......................... G02B 6/10 385/132
2015/0138041 A1 * 5/2015 Hirakata ................. G09G 5/14 345/1.3
2015/0146069 A1 * 5/2015 Yamazaki ........... H04N 23/632 361/748
2015/0227227 A1 8/2015 Myers et al.
2015/0331451 A1 * 11/2015 Shin ..................... G06F 1/1626 345/173
2015/0342307 A1 * 12/2015 Weber ...................... D03D 1/00 362/559
2015/0378094 A1 * 12/2015 Lu ....................... G02B 5/3033 385/116
2016/0026219 A1 * 1/2016 Kim ................... H04M 1/0245 345/173
2016/0188197 A1 * 6/2016 Ryu ..................... G06F 1/1694 345/156
2016/0231784 A1 * 8/2016 Yu .................... G02F 1/133305
2016/0234362 A1 * 8/2016 Moon ................ H04M 1/0266
2016/0238785 A1 * 8/2016 Park .................... G02B 6/0068
2016/0341892 A1 * 11/2016 Yang ................... G02B 6/0078
2017/0235341 A1 * 8/2017 Huitema ............... G04G 17/08 361/679.03

(56) References Cited

U.S. PATENT DOCUMENTS

2018/0052312 A1* 2/2018 Jia ........................ G02F 1/13336
2018/0059621 A1* 3/2018 Singh ..................... G04G 21/04
2018/0074639 A1* 3/2018 Powell .................... G06F 3/044
2018/0088416 A1* 3/2018 Jiang ................. G02F 1/133611
2018/0128973 A1* 5/2018 Powell ..................... G02B 6/06
2018/0183913 A1* 6/2018 Kwak ................... G06F 1/1647
2018/0372958 A1* 12/2018 Karafin ................... G06F 3/011
2019/0074331 A1* 3/2019 Oh ....................... H10K 50/822
2019/0129248 A1* 5/2019 Zang ....................... G02F 1/157

* cited by examiner

ELECTRONIC DEVICES HAVING HOUSINGS WITH IMAGE TRANSPORT LAYERS

This application claims the benefit of provisional patent application No. 62/760,526, filed Nov. 13, 2018, which is hereby incorporated by reference herein in its entirety.

FIELD

This relates generally to electronic devices, and, more particularly, to electronic devices with image transport layers.

BACKGROUND

Electronic devices such as cellular telephones, tablet computers, and other electronic equipment may include housing structures. Electrical components such as displays and sensors may be mounted within the housing structures.

If care is not taken, an electronic device may not have a desired appearance or may be difficult to use satisfactorily. For example, housing structures may not have a desired shape and may not accommodate desired electrical components.

SUMMARY

An electronic device may have displays. The displays may be flexible organic light-emitting diode displays or other displays. Pixels in the displays may display images.

The electronic device may be a portable device such as a handheld device, a wristwatch device, or other electronic equipment. Image transport layers for the electronic device may be formed from coherent fiber bundles or Anderson localization material.

In an illustrative configuration, the electronic device has first and second display layers that face away from each other. The pixels of these display layers may display images in different directions. Respective image transport layers may overlap the display layers and may have curved edges that overlap a sidewall portion of the electronic device. The image transport layers may receive images from the first and second display layers at respective input surfaces and transport the received images to corresponding output surfaces, thereby covering the surface of the electronic device with a displayed image.

In some arrangements, image transport layers may be provided with hemispherical shapes and other shapes having output surfaces of compound curvature. Display layers and overlapping image transport layers may be covered with transparent housing structures (display cover layers) to help protect the display layers and image transport layers.

A folding device may have first and second displays that are overlapped by respective first and second image transport layers. These image transport layers may have respective edge portions that are configured to mate over a hinge when the folding device is placed in an unfolded planar configuration. In this configuration, the output surfaces of the image transport layers may be joined to form a unitary display and mating edge portions of the image transport layers may block the hinge from view. In a folded configuration, the first and second displays may face away from each other.

A wristwatch device may have a strap with links or other structures. The strap may be coupled to a main wristwatch unit that has a display and other components. A light source with one or more light-emitting devices such as one or more light-emitting diodes may be used to supply light to an image transport layer. The image transport layer may be located in one of the links of the strap and the light source may have light-emitting diodes mounted in a housing associated with the main unit of the wristwatch device.

DETAILED DESCRIPTION

Electronic devices may be provided with displays and other visual output devices. For example, an electronic device may have a display with an array of pixels that displays an image. To help enhance device aesthetics and/or to help enhance performance, the electronic device may include structures that transport the image or other visual output from an input surface to an output surface through coherent fiber bundle or a layer of Anderson localization material. Structures such as these may sometimes be referred to as image transport layers, image transport structures, image transport layer structures, etc.

As an example, an electronic device may have a display on which an image is displayed. An image transport layer may overlap the display so that an input surface of the image transport layer is adjacent to the display and receives the image from the display. The image transport layer may transport the image from the input surface to a corresponding output surface of the image transport layer. The output surface faces outwardly from the electronic device, so that the image on the output surface may be viewed by a user of the electronic device. If desired, the output surface may have a curved cross-sectional profile and one or more areas of compound curvature.

The image transport layer structures in the electronic device may be configured to accommodate curved surfaces, to hide display seams, to hide hinges or other mechanical structures, to reduce display border widths, to distribute an image or other visual output over multiple surfaces of the device, or to otherwise provide the electronic device with a desired shape and ability to supply a user with visual output.

Figure 1:
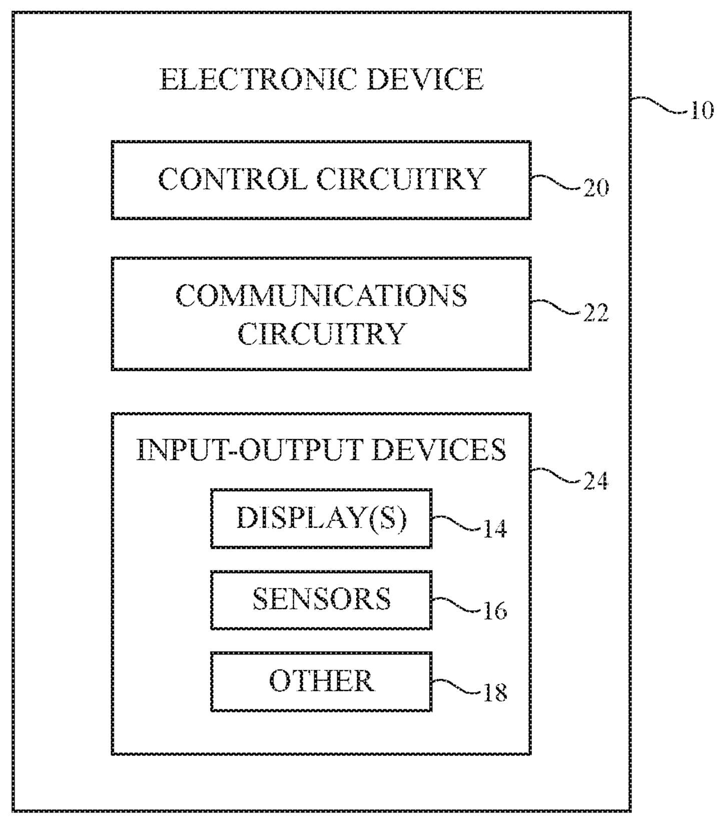
FIG. 1 is a schematic diagram of an illustrative electronic device in accordance with an embodiment.

A schematic diagram of an illustrative electronic device having an image transport layer is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Display 14 may have an array of pixels configured to display images for a user. The display pixels may be formed on one or more substrates such as one or more flexible substrates (e.g., display 14 may be formed from a flexible display panel). Conductive electrodes for a capacitive touch sensor in display 14 and/or an array of indium tin oxide electrodes or other transparent conductive electrodes overlapping display 14 may be used to form a two-dimensional capacitive touch sensor for display 14 (e.g., display 14 may be a touch sensitive display).

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
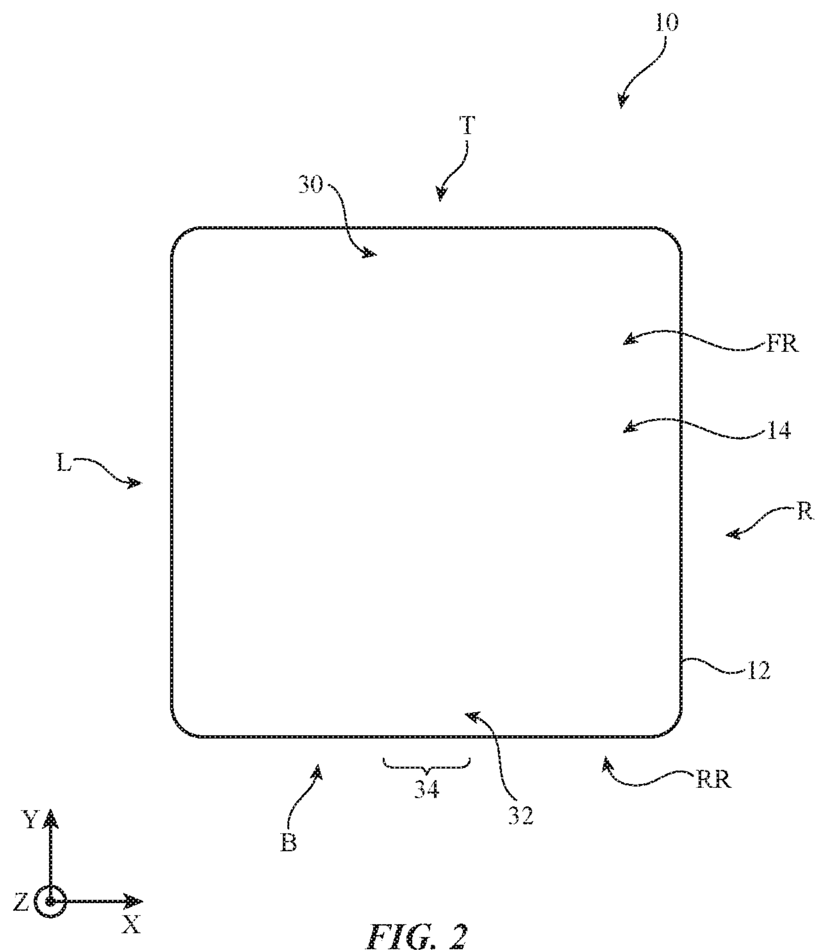
FIG. 2 is a top view of an illustrative electronic device in accordance with an embodiment.

FIG. 2 is a front (plan) view of electronic device 10 in an illustrative configuration in which display 14 covers some or all of the front face FR of device 10. Opposing rear face RR of device 10 may be covered by a housing wall formed from glass, metal, polymer, and/or other materials. Rear face RR may be free of display pixels and/or may be partly or fully covered by display 14.

Device 10 may include a housing (e.g., housing 12) that forms sidewall structures for device 10 and/or internal supporting structures (e.g., a frame, midplate member, etc.). Glass structures, transparent polymer structures, image transport layer structures, and/or other transparent structures that cover display 14 and other portions of device 10 may provide structural support for device 10 and may sometimes be referred to as housing structures. For example, a glass or polymer layer that covers and protects a pixel array in display 14 may serve as a display cover layer while also serving as a housing structure for device 10.

In some illustrative arrangements, sidewall portions of device 10 may be covered with portions of display 14. In the example of FIG. 2, device 10 is characterized by four peripheral edges: upper edge T, lower edge B, left edge L, and right edge R. Upper edge T and opposing lower edge B may run parallel to each other and parallel to the X axis of FIG. 2. Left edge L and opposing right edge R may run parallel to each other and parallel to the Y axis of FIG. 2. Front face FR and rear face RR may be planar (e.g., two parallel planes offset by a distance along the Z axis) and/or may include curved portions.

Touch sensor circuitry such as two-dimensional capacitive touch sensor circuitry may be incorporated into one or more displays in device 10 as separate touch sensor panels overlapping display pixels or as part of one or more display panels in device 10. Touch sensors may be formed on front face FR, rear face RR, and/or edges (sidewall faces) T, B, R, and/or L. If desired, icons and other images for virtual buttons may be displayed by the pixels of device. For example, virtual buttons and/or other images may be displayed on front face FR, rear face RR, and/or edges T, B, R, and/or L and may overlap touch sensor circuitry. Haptic output devices may be used to provide haptic feedback when virtual buttons are selected (as an example).

Device 10 of FIG. 2 has a rectangular outline (rectangular periphery) with four rounded corners. If desired, device 10 may have other shapes. For example, device 10 may have a shape that folds and unfolds along a bend (folding) axis and may include a display that overlaps or that does not overlap the bend axis, may have a shape with an oval footprint or circular outline, may have a cubic shape, may have a pyramidal, cylindrical, spherical, or conical shape, or may have other suitable shapes. The configuration of FIG. 2 is illustrative.

If desired, openings may be formed in the surfaces of device 10. For example, a speaker port and optical windows for an ambient light sensor, an infrared proximity sensor, and a depth sensor may be formed in a region such as upper region 30 of front face FR. A fingerprint sensor, touch sensor button, force-sensitive button, or other sensor that operates through display 14 may be formed under the portion of display in lower region 32 on front face FR and/or other portions of front face FR and/or other external surfaces of device 10. Device 10 may be free of connector openings or an opening for a connector (e.g., a digital data connector, analog signal connector, and/or power connector) may be formed in portion 34 of the lower sidewall of device 10 running along lower edge B or elsewhere in device 10. Openings may be omitted when power is received wirelessly or is received through contacts that are flush with the surface of device 10 and/or when data is transferred and received wirelessly using wireless communications circuitry in circuitry 22 or through contacts that are flush with the exterior surface of device 10.

Figure 3:
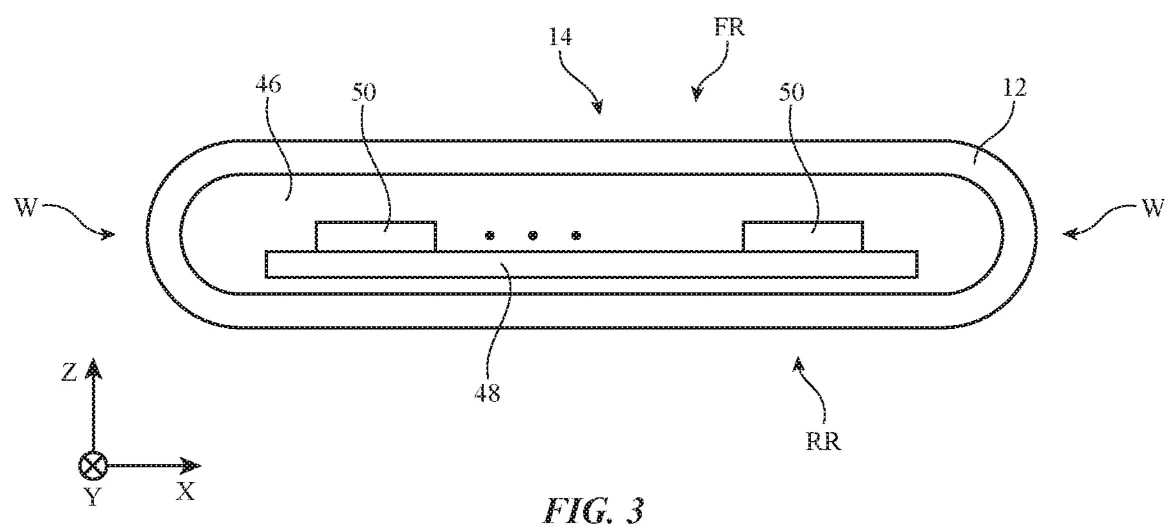
FIG. 3 is a cross-sectional side view of an illustrative electronic device in accordance with an embodiment.

FIG. 3 is a cross-sectional side view of an illustrative electronic device. As shown in FIG. 3, device 10 may have a housing such as housing 12. Housing 12 may include structures formed from glass, polymer, metal, wood, sapphire or other crystalline material, ceramic, fabric, other materials, and/or combinations of these materials. In some configurations, transparent portions of housing 12 may be configured to form display cover layers that overlap one or more displays or other light-emitting optical components. In the example of FIG. 3, display 14 is formed on front face FR of device 10. Display 14 includes an array of pixels. During operation, the pixels are used to display an image for viewing by a user of device 10. Arrays of pixels for displays in device 10 may sometimes be referred to as pixel layers, pixel array layers, displays, display structures, display layers, or display panels. In general, displays and other optical components may be located on front face FR, rear face RR, and/or sidewalls W of device 10 (e.g., sidewalls on edges T, B, R, and/or L that extend between front face FR and rear face RR). Housing 12 may have planar portions (e.g., in central portions of front face FR and rear face RR and/or on sidewalls W of device 10) and/or curved portions (e.g., curved edges, curved corners, portions of front face FR and/or rear face RR that have curved cross-sectional profiles, etc.).

As shown in FIG. 3, device 10 may include electrical components 50 in interior 46 (e.g., integrated circuits, sensors and other input-output devices, control circuitry, display layers such as organic light-emitting diode panels or other display layers, etc.). Electrical components 50 may, if desired, be mounted on printed circuits such as printed circuit 48 (e.g., flexible printed circuits and/or printed circuits formed from rigid printed circuit board material). In some configurations, a display may be formed on rear face RR. In other configurations, no display is present on rear face RR. In configurations in which no display is present on rear face RR, the portion of housing 12 on rear face RR may be formed from metal (e.g., a stainless steel or aluminum layer). For example, device 10 may have a rear housing wall formed from metal and may have optional sidewalls that extend upwardly from the rear housing wall. If desired, device 10 may have a rear housing wall and/or other housing walls formed from opaque glass, transparent glass coated with opaque materials such as ink or metal, and/or other housing wall materials.

In some configurations for device 10, an opaque material such as metal or opaque polymer may form some or all of sidewalls W of device 10. As an example, metal that forms some or all of a rear housing wall on rear face RR of device 10 may protrude upwardly along the edges of device 10 to form some or all of the sidewalls for device 10. As another example, a peripheral metal band that forms some or all of the sidewalls of device 10 may extend around the rectangular periphery of device 10 (e.g., along upper edge T, right edge R, lower edge B, and left edge L). Sidewalls may have vertically extending planar surfaces and/or may exhibit other surface profiles (e.g., curved profiles).

If desired, some or all of the sidewalls of device 10 may be formed from clear material and may overlap light-producing components. This material may, as an example, be part of a display cover layer (e.g., a sidewall may be formed from an extension of a central display cover layer portion and may be formed from glass, polymer, crystalline material, etc.). Because clear layers of glass, plastic, crystalline material, and/or other clear layers of material in device 10 may enclose and protect internal device components, these outer layers of material in device 10 may serve as portions of housing 12 for device 10.

In configurations for device 10 in which sidewalls have transparent portions formed from extending portions of a display cover layer or other transparent material, the sidewalls may overlap light-emitting components. Transparent sidewalls may have planar and/or curved surfaces and may be formed from clear glass, clear polymer, transparent crystalline material such as sapphire, and/or other transparent protective material. Displays (pixel arrays), light-emitting diodes covered with diffusing material, light-emitting diodes covered with patterned masks (e.g., opaque coatings with icon-shaped openings or openings of other shapes), and/or other light-emitting devices may be placed under clear sidewalls.

Figure 4:
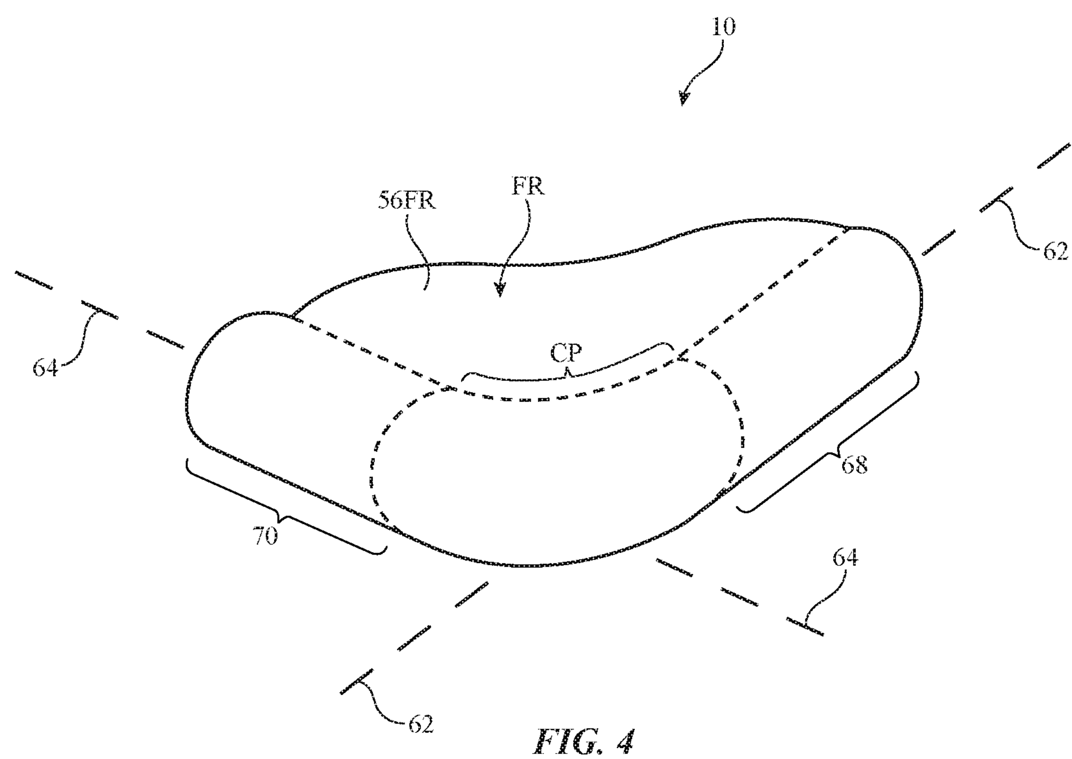
FIG. 4 is a perspective view of an illustrative corner of an electronic device in accordance with an embodiment.

If desired, device 10 may have external surfaces with compound curvature. A perspective view of an illustrative corner portion of device 10 is shown in FIG. 4. In the example of FIG. 4, device 10 has edge portions 68 and 70 formed from sidewalls W (FIG. 3). Edge portions 68 and 70 may have surfaces that curve about axes 62 and 64, respectively. These portions of housing 12 extend along the straight sides of device 10 and are characterized by curved surfaces that can be flattened into a plane without distortion (sometimes referred to as developable surfaces). At the corner of device 10 of FIG. 4, device 10 has curved surface portions CP with compound curvature (e.g., a surface that can only be flattened into a plane with distortion, sometimes referred to as a surface with Gaussian curvature). Each of the four corners of device 10 may have this arrangement, if desired.

Flexible displays such as organic light-emitting diode displays with flexible polyimide substrates or other bendable polymer substrates can be bent about axes such as axes 62 and 64 to form curved surfaces in portions 68 and 70 (e.g., these substrates may be bent without wrinkling or other undesired deformation). In compound curvature regions such as corner regions of device 10, display 14 can be formed from materials that stretch (e.g., displays formed from mesh-shaped elastomeric substrate material), may be formed from flexible displays that are patterned to create one or more flexible strips and/or other structures that can be bent to cover at least part of the compound curvature regions, may be formed from bent tab portions that are part of a display (display substrate) that also is overlapped by a display cover layer on front face FR and/or other portions of device 10, may be formed using pixels on one or more display substrates that are separate from a main central display substrate, and/or may be formed from other display structures.

To help accommodate optical components within housing 12, device 10 (e.g., housing 12) may include one or more image transport layer structures (e.g., coherent fiber bundles or Anderson localization material). The image transport layer structures may transport light (e.g., image light and/or other light) from one surface to another while preventing the light from spreading laterally and thereby preserving the integrity of the image light or other light. This allows an image produced by an array of pixels in a flat or curved display to be transferred from an input surface of a first shape at a first location to an output surface with compound curvature or other desired second shape at a second location. The image transport layer may therefore move the location of an image and may optionally change the shape of the surface on which the image is presented.

Figure 5:
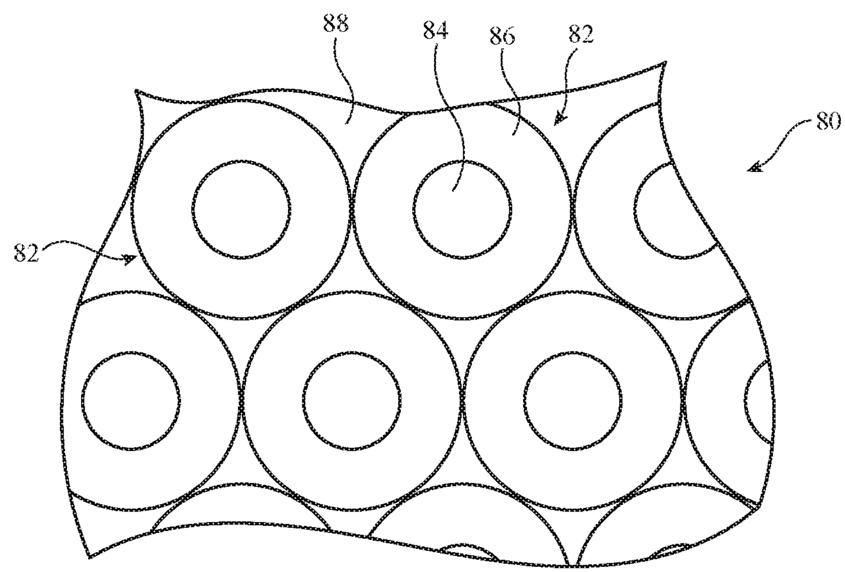
FIG. 5 is a cross-sectional side view of an illustrative image transport layer in accordance with an embodiment.

Fiber bundles include fiber cores of a first refractive index surrounded by cladding (e.g., polymer) of a second, lower refractive index. In some configurations, additional polymer, which may sometimes be referred to as binder or secondary cladding, may be included. A cross-sectional view of an illustrative image transport layer formed from a fiber bundle is shown in FIG. 5. In the example of FIG. 5, image transport layer 80 is formed from a bundle of fibers 82. Fibers 82 may have respective fiber cores 84. Cores 84 may be surrounded by material with a different index of refraction than cores 84. For example, each core 84 may have a first index of refraction and the material surrounding that core may have a second index of refraction that is lower than the first index of refraction by an index difference of at least 0.05, at least 0.1, at least 0.15, at least 10%, at least 20%, less than 50%, less than 30%, or other suitable amount. When the material surrounding cores 84 has a refractive index that is lower than cores 84, light may be guided within cores 84 in accordance with the principal of total internal reflection.

In the example of FIG. 5, cores 84, which may be formed from transparent material such as glass or polymer, are surrounded by lower index structures such as claddings 86 (e.g., glass or polymer of lower refractive index). Additional material (e.g., optional binder 88) may be included in image transport layer 80 (e.g., to hold fibers 82 in place, etc.). Binder 88 may be formed from a material (e.g., polymer or glass) with a refractive index lower than that of cores 84 and/or lower than that of cladding 86 to promote total internal reflection in cores 84. In some configurations, cores 84 may be coated with metal and/or surrounded by air or other material to help confine light within cores 84. Arrangements in which some of cores 84, some of cladding 86, and/or some of binder 82 are formed from materials such as opaque material, colored transparent material, infrared-light-blocking-and-visible-light-transmitting material, infrared-light-transmitting-and-visible-light-blocking material, and/or other materials may also be used. For example, some of these structures may be formed from a black polymer or other light-absorbing material to help absorb stray light (e.g., light that is not being guided within cores 84). If desired, polymer 88 may be omitted (e.g. in arrangements in which cladding 86 is used to hold fibers 82 together in image transport layer 80).

The diameters of cores 84 may be, for example, at least 5 microns, at least 7 microns, at least 8 microns, at least 9 microns, less than 40 microns, less than 17 microns, less than 14 microns, less than 11 microns, or other suitable diameter. Fibers 82 may have diameters of at least 6 microns, at least 7 microns, at least 8 microns, at least 9 microns, less than 50 microns, less than 17 microns, less than 14 microns, less than 11 microns, or other suitable diameter.

Figure 6:
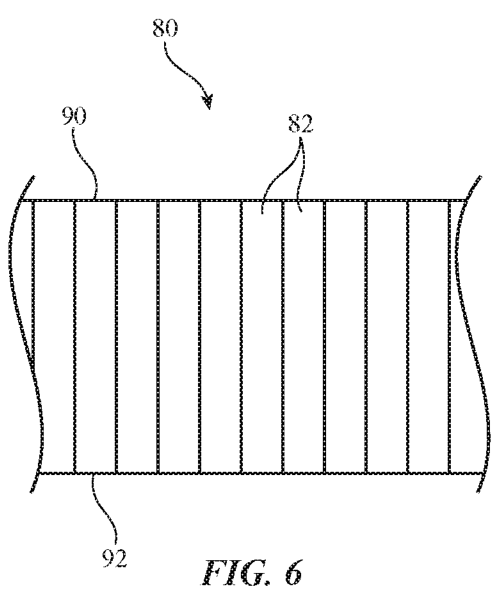
FIG. 6 is a cross-sectional side view of an illustrative image transport layer in accordance with an embodiment.

As shown in FIG. 6, fibers 82 may extend parallel to each other in image transport layer 80 (e.g., the fibers may run next to each other along the direction of light propagation through the fiber bundle). This allows image light or other light that is presented at input surface 90 to be conveyed to output surface 92. In the example of FIG. 6, surfaces 90 and 92 are planar and fibers 82 extend in straight lines between surfaces 90 and 92. Other arrangements such as arrangements in which fibers 82 are bent and/or taper and/or in which surface 90 and/or surface 92 have curved cross-sectional profiles may also be used.

In general, image transport layers such as image transport layer 80 of FIG. 6 and the other FIGS. may be formed from a coherent fiber bundle (see, e.g., FIG. 5) or may be formed from Anderson localization material instead of a coherent fiber bundle. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material). Configurations in which image transport layer 80 has a bundle of fibers 82 are sometimes described herein as an example.

Fiber bundles and Anderson localization material can be used to form plates (e.g., layers with a thickness of at least 0.2 mm, at least 0.5 m, at least 1 mm, at least 2 mm, at least 5 mm, less than 20 mm, or other suitable thickness) and/or other image transport structures (e.g., straight and/or bent elongated light pipes, spherical shapes, cones, tapered shapes, etc.). As described in connection with FIG. 6, the surfaces of image transport structures may be planar and/or may have curved profiles.

Image transport layers can be used to transport an image from a first surface (e.g., the surface of a pixel array) to a second surface (e.g., a surface in device 10 with compound curvature or other curved and/or planar surface shape) without causing the image light to spread laterally. For example, an image that is produced by a display can be transported 5 mm vertically through an image transport layer that is 5 mm thick and can then be viewed on the output surface of the image transport layer. As another example, an image transport layer may have a planar input surface and an output surface with a planar central region surrounded by curved edges and corners of compound curvature. With this type of arrangement, images produced by a display that rests against the planar input surface can be smoothly transported to an output surface without becoming blurred, even if the output surface contains curved portions such as areas of compound curvature. Curved image transport layer surfaces can be formed by polishing, slumping heated fiber bundle material, molding under heat and/or pressure, etc. In devices with optical sensors and other optical components, light may, if desired, be transported through an image transport structure to and/or from an optical component.

In portions of device 10 that have an externally viewable display, a display cover layer that forms at least part of housing 12 may be used to cover and protect image transport layer 80 or an image transport layer that is uncovered by a separate display cover layer may be used in forming at least part of housing 12.

In arrangements in which a display cover layer is used to cover and project layer 80, adhesive, touch sensor structures, diffuser layers, masking layers, filter layers, antireflection layers, and/or other structures may optionally be interposed between layer 80 and the display cover layer. The display cover layer may be formed from glass, polymer, ceramic, crystalline material such as sapphire, multiple layers of these materials and/or other materials and may have optional coatings (e.g., an antireflection layer, an antiscratch layer, an antismudge layer, etc.). The display cover layer may form some or all of housing 12 of FIG. 3. A display layer with an array of pixels that displays an image may be located within the interior of housing 12. Image transport layer 80 may be interposed between the array of pixels and the display cover layer so that the image on the pixel array is transported from the input surface of the image transport layer to the output surface of the image transport layer. The image on the output surface of the image transport layer is visible through the display cover layer forming the portion of housing 12 that overlaps the image transport layer.

In arrangements in which no display cover layer is present, one or more portions of housing 12 of FIG. 3 may be formed from an image transport layer that is not covered with a separate protective member. For example, an image transport layer with a planar central portion, curved peripheral edges, and corners of compound curvature may be used to form an upper portion and sidewall portion of housing 12. In this type of configuration, the outside of image transport layer 80 is not covered with a separate display cover layer member so that output surface 92 forms the outermost surface of housing 12 of FIG. 3. The pixel array may be formed against input surface 90 of the image transport layer, which may form the innermost surface of housing 12 of FIG. 3.

During use, output surface 92 may contact external objects. To prevent damage to image transport layer 80 (e.g., the portion of housing 12 of FIG. 3 that overlaps the pixel array), output surface 92 may be strengthened using a chemical strengthening process or other strengthening process. For example, in a scenario in which layer 80 is formed from glass, surface 92 of layer 80 may be strengthened using an ion exchange chemical strengthening treatment and/or other strengthening processes (e.g., heat treatment, etc.). Chemical strengthening may be performed by placing a glass image transport layer in a heated potassium salt bath to perform an ion-exchange process. Chemical strengthening in this way may enhance the compressive stress of the outermost surfaces of the glass image transport layer relative to deeper portions. Heat treatment (e.g., thermal tempering) may also be used to create compressive stress on outer surfaces of image transport layer 80. By creating compressive stress on the surface of image transport layer 80, the strength of output surface 92 may be enhanced. If desired, an antiscratch coating, an antireflection coating, an antismudge coating, and/or other exterior coating layers may be applied to surface 92. When layer 80 is strengthened at output surface 92, layer 80 is able to withstand damage during drop events and other events that impose stress on layer 80.

Illustrative image transport layers 80 are shown in FIGS. 7, 8, 9, 10, and 11. Structures such as these may have lower surfaces that serve as input surfaces (e.g., to receive image light from a display) and opposing upper surfaces (e.g., surfaces with curved edges aligned with the periphery of device 10). For example, structures such as these may be provided on front face FR so that the curved edges of these structures run around the periphery of device 10 while the planar portions of these structures overlap the center of display 14 on front face FR (as an example). Image transport layers 80 may also be provided on rear face RR. With an illustrative configuration, a first image transport layer covers front face FR and partly overlaps sidewalls W, wherein a second image transport layer covers the rear face RR and partly overlaps sidewalls W. In this type of illustrative arrangement, the output surfaces of the first and second image transport layers may meet along sidewalls W.

Figure 7:
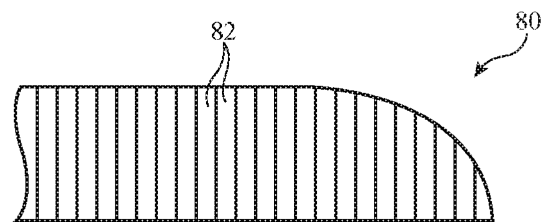
FIGS. 7, 8, 9, 10, and 11 are cross-sectional side views of illustrative image transport layers in accordance with embodiments.

As shown in the example of FIG. 7, fibers 82 may be oriented to extend vertically through image transport layer 80.

Figure 8:
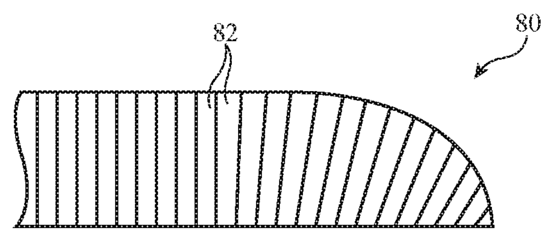

FIG. 8 shows how fibers 82 may be tilted by progressively increasing amounts at increasing distances toward the curved outer peripheral edge of image transport layer 80.

Figure 9:
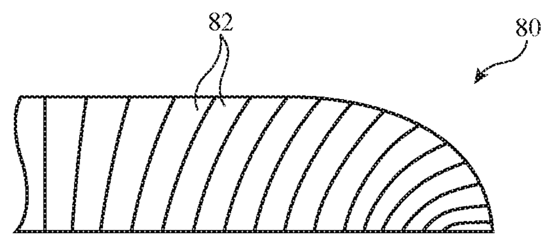

In the example of FIG. 9, fibers 82 are both tilted and curved.

Figure 10:
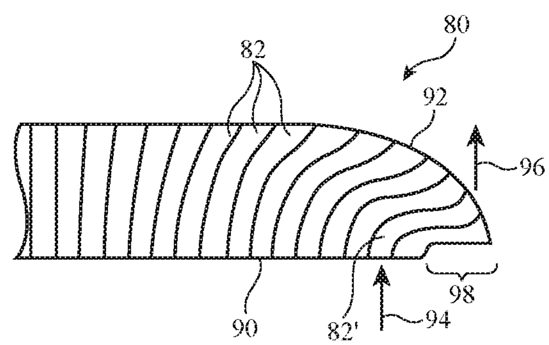

FIG. 10 shows how fibers 82 may contain multiple bends along their lengths. This allows the entrances and exit portions of the fibers to be oriented along the desired direction of light propagation. As an example, fiber 82' may have an entrance portion with a longitudinal axis that is aligned parallel or nearly parallel to light entrance direction 94 so that light from a display or other optical component may be emitted efficiently into fiber 82 in direction 94. Fiber 82' may also have an exit portion with a longitudinal axis that is aligned parallel or nearly parallel to light emission direction 96 (e.g., a direction facing a viewer) so that light emitted from the curved edge portion of image transport layer will be directed toward the viewer rather than being angled away from the viewer. If desired, the entrance and output faces of each fiber may be oriented to facilitate light output in desired directions. Optional grooves and other structures may also be formed in image transport layer 80 (see, e.g., illustrative peripheral groove 98). This may facilitate the coupling of layer 80 to a housing structure and/or may otherwise facilitate the mounting of image transport layer 80 within device 10 (as an example).

Figure 11:
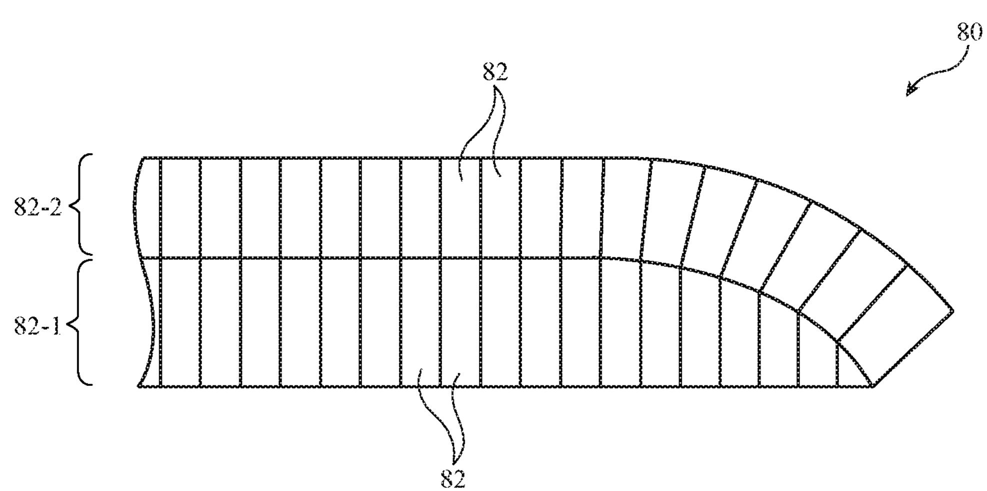

In the illustrative configuration of FIG. 11, image transport layer 80 has multiple overlapped portions such as lower portion 80-1 and upper portion 80-2. Portions 80-1 and 80-2 may be plates or other layers that have fibers 82 with different orientations. As an example, portion 80-1 may have vertically oriented fibers 82 and portion 80-2 may have tilted fibers that are oriented at a non-zero angle with respect to fibers 82 in portion 80-1. Fibers 82 in different portions of layer 80 may, if desired, be aligned end-to-end. Arrangements in which fibers 82 in different portions of layer 80 are not aligned may also be used. If desired, image transport layer 80 may have three or more overlapped layers of fibers with potentially different orientations and/or shapes. Each sublayer of fibers 82 in layer 80 may have input and/or output surfaces that are planar and/or that are curved. The configuration of FIG. 11 is merely illustrative.

Device 10 may include one or more protective structures formed from clear portions of housing 12. As an example, housing 12 of device 10 may have a clear portion such as portion 12-1 of FIG. 12 that overlaps image transport layer 80 and display layer 100. Housing 12 may also have a portion such as portion 12-2 (e.g., a metal housing wall, a transparent housing wall such as a glass housing wall with an inner surface covered with an opaque masking material such as ink, metal, and/or other coating materials, and/or other housing wall materials).

Portion 12-1 may form a display cover layer that covers a display layer such as display layer 100. Display layer 100 may have an active area such as active area 104 with an array of pixels 102 that display an image for a viewer such as viewer 108 who is viewing device 10 in direction 110. Display layer 100 may also have an inactive area such as inactive border area 106 that contains metal signal paths, display driver circuitry, encapsulation structures, and other structures that do not emit light. Inactive border area 106 of display layer 100 is free of pixels and therefore does not display any part of the image that is displayed by display layer 100. In some configurations, portion 12-1 may be omitted, so that image transport layer 80 forms housing 12 over display layer 100 and so that output surface 92 forms the outermost portion of housing 12 above display layer 100. The arrangement of FIG. 12 is illustrative.

Figure 12:
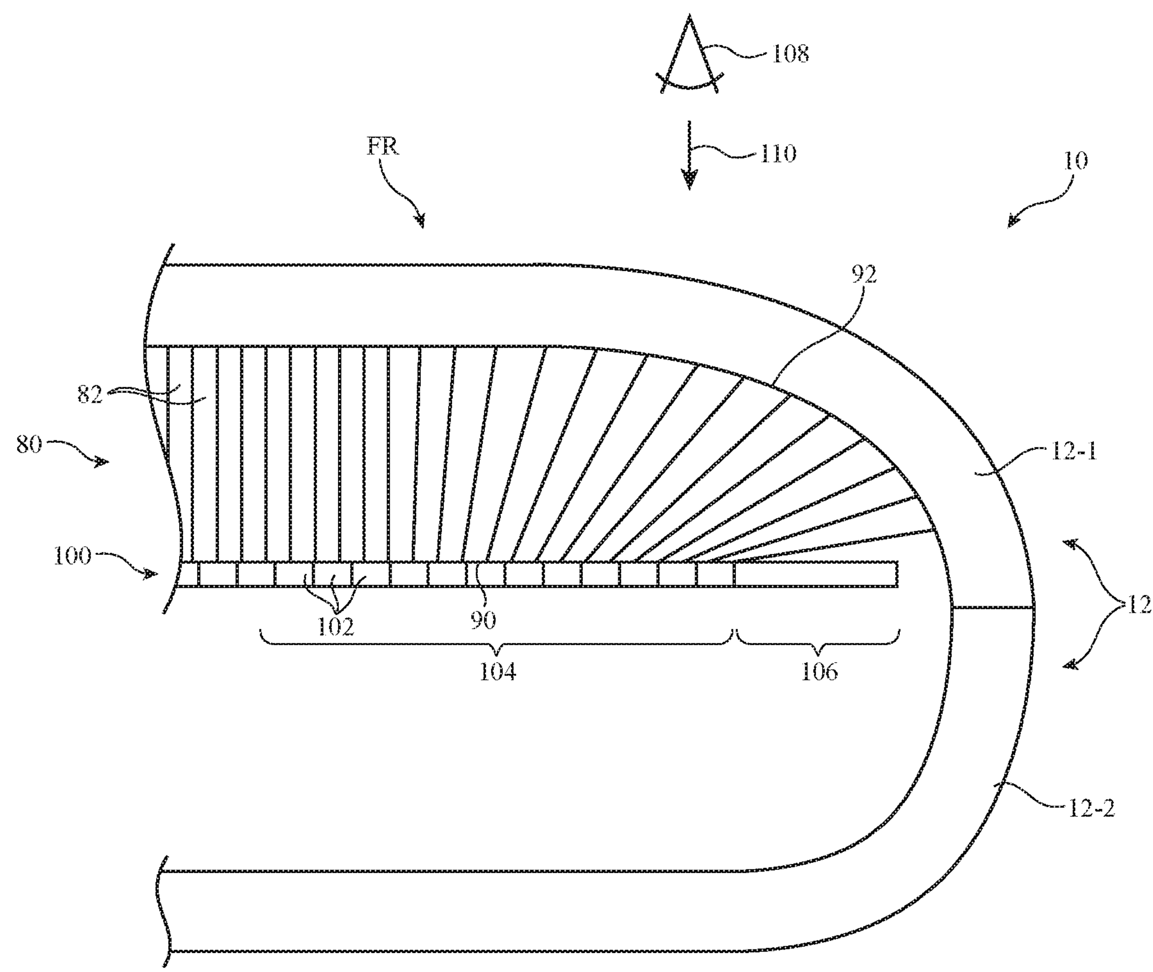
FIGS. 12, 13, and 14 are cross-sectional side views of portions of illustrative electronic devices with image transport layers in accordance with embodiments.

To help hide inactive border area 106 from view by viewer (user) 108, some of fibers 82 of image transport layer 80 may be tilted as shown in FIG. 12. As a result, the image from the pixel array in active area 104 on input surface 90 of layer 80 will be transported to an enlarged output surface 92. Surface 92 overlaps inactive border area 106 when device 10 and display layer 100 are viewed in direction 110 as viewer 108 is viewing front face FR of device 10, so that the image on surface 92 extends to the outermost periphery of device 10 or nearly to the outermost periphery of device 10, thereby hiding inactive border area 106 from view. Image transport layer 80 of FIG. 12 also has a curved edge profile and may have corners of compound curvature.

Figure 13:
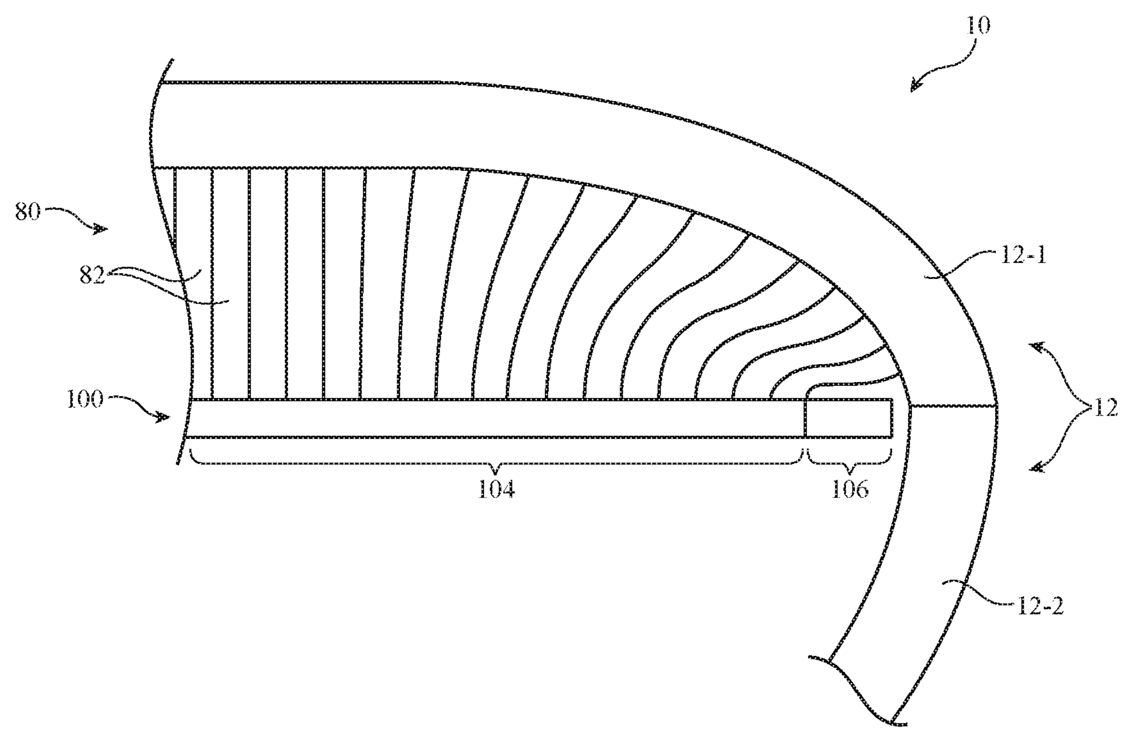
Figure 14:
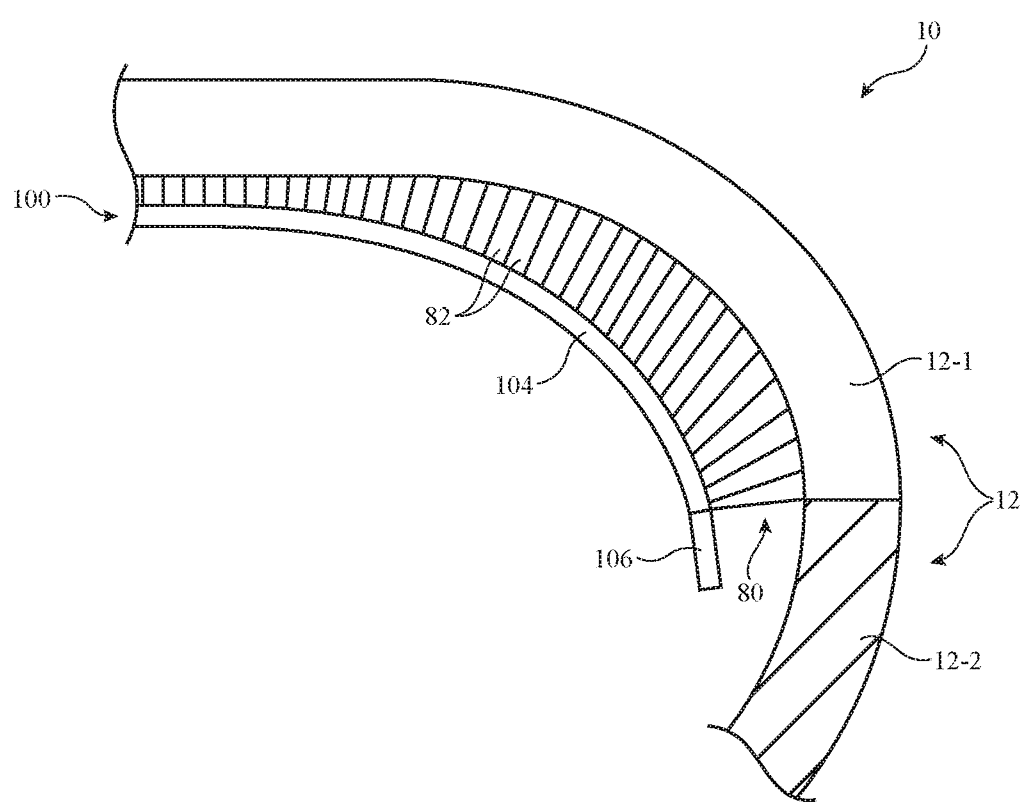

In the example of FIG. 12, fibers 82 are tilted by increasing amounts at increasing distances from the outer edge of area 104 toward the periphery of device 10. If desired, fibers 82 may have one or more bends along their lengths, as shown in the illustrative arrangement for device 10 that is shown in FIG. 13. FIG. 14 shows how display layer 100 may, if desired, have one or more portions that are bent. Layer 100 may, as an example, be formed from an organic light-emitting diode display substrate of polyimide or other flexible polymer covered with thin-film transistors, thin-film organic light-emitting diode pixels, and/or other thin-film circuitry. In this type of arrangement, layer 100 may have one, two, three, four, or more than four edges with curved cross-sectional profiles as shown in FIG. 14. Image transport layer 80 may have a mating curved input surface that receives an image from layer 100 and may have a curved output surface. The curved output surface of image transport layer 80 may mate with the curved inner surface of housing portion 12-1.

Other arrangements for placing image transport layer 80 over display layer 100 may be used, if desired. For example, portions of image transport layer 80 may, if desired, overlap opaque housing structures (e.g., to provide device 10 with a borderless appearance). Image transport layer 80 may also serve as the outermost structure of device 10 (e.g., housing portion 12-1 may be omitted). The configurations of FIGS. 12, 13, and 14 are illustrative.

In some configurations, portions of device 10 are not covered with active portions of display 14 and are therefore available to accommodate components such as sensors 16, speakers, and/or other electrical components. For example, one or more areas on front face FR of device 10 may be available to accommodate electrical components. These areas may be free of pixels and free of any of the output surface of image transport layer 80 that is emitting an image presented to the input surface of that image transport layer.

Sensors such as capacitive sensors, radio-frequency circuitry, signal lines, electrical components for forming sensors and other input and output devices, and other circuitry may be incorporated into image transport layer 80. This type of arrangement may help place electrical components at a desired distance (e.g., a small distance) from the outermost surface of device 10. For example, by placing capacitive sensor circuitry in image transport layer 80, capacitive sensor electrodes in layer 80 may be placed close to the exterior surface of device 10, thereby enhancing sensor accuracy and sensitivity when making sensor measurements. As another example, placement of wireless circuitry such as antennas within image transport layer 80 may help separate such wireless circuitry from potentially interfering conductive structures in the interior of device 10 and can enhance wireless signal transmission and reception.

Figure 15:
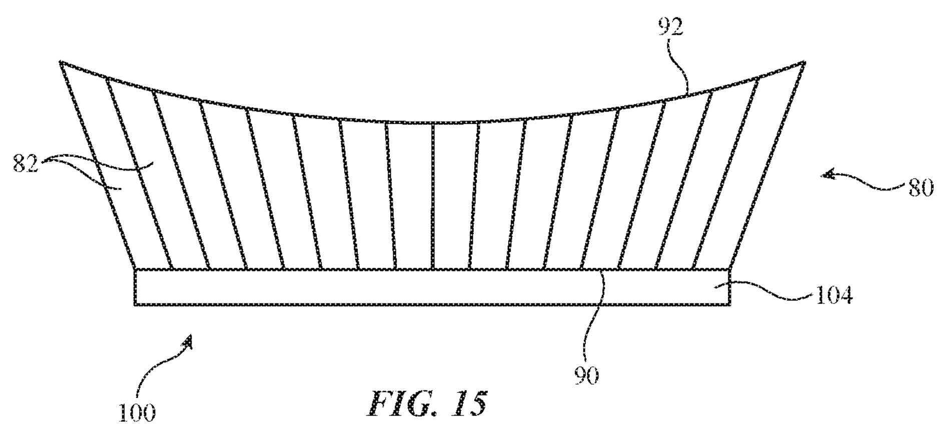
FIG. 15 is a cross-sectional side view of an illustrative image transport layer with a curved output surface in accordance with an embodiment.

FIG. 15 is a cross-sectional side view of image transport layer 80 in an illustrative configuration in which output surface 92 is curved. Output surface 92 may be curved about a single axis (e.g., surface 92 may have left and right edges that are bowed inwardly towards a user who is viewing surface 92) or may form a surface that curves in two lateral dimensions (e.g., surface 92 may be a concave surface). Image transport layers of the type shown in FIG. 15 may be used in computer displays and other displays for which it is desirable to curve the outer edges of the display toward the user to enhance viewing comfort (as an example).

Figure 16:
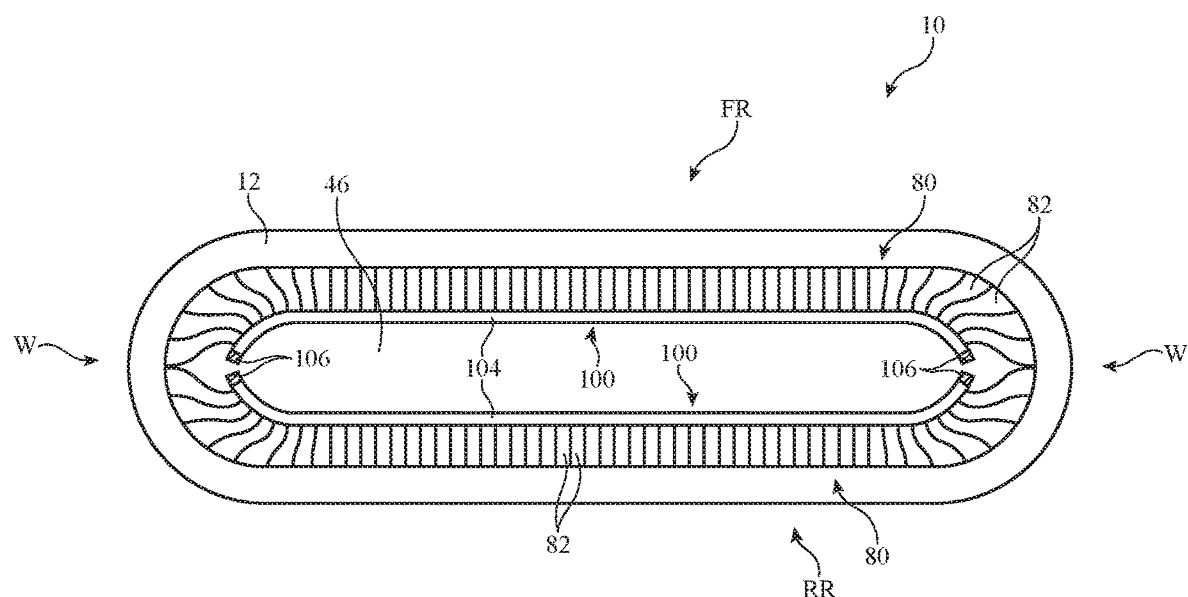
FIG. 16 is a cross-sectional side view of an illustrative electronic device with image transport layers overlapping respective flexible display layers with bent edge portions in accordance with an embodiment.

FIG. 16 is a cross-sectional side view of device 10 in an illustrative configuration in which device 10 displays images on front face FR, rear face RR, and the surfaces of sidewalls W. Image transport layers 80 may be associated with the front and rear of device 10. The peripheral edges of image transport layers 80 may contain fibers 82 that are bent to distribute image light from active areas 106 of display layers 100 to sidewalls W. This allows device 10 to display an image over most or all of its exposed surface including front face FR, rear face RR, and sidewall W.

Housing 12 may be formed from one or more structures (e.g., glass layers, layers of polymer or crystalline material such as sapphire, etc.). Housing 12 may have peripheral edges and, if desired, corners with curved cross-sectional profiles. Display layers 100 may be planar and/or may have curved portions. For example, the peripheral edges of display layers 100 may be bent (see, e.g., FIG. 16) to help hide inactive areas 106 of display layers 100. The input surface of each image transport layer 80 may overlap a corresponding active area 104 of a respective display layer 100. There may be any suitable number of display layers 100 in device 10. In the example of FIG. 16, a first (upper) display layer 100 has an array of pixels forming a first active area 104 that displays a first image that is viewable on the output surface of a first image transport layer 80 through a first (upper) portion of transparent housing 12 and a second (lower) display layer 100 has an array of pixels forming a second active area 104 that displays a second image that is viewable on the output surface of the second image transport layer through a second (lower) portion of transparent housing 12. Due to the flared edge portions of image transport layers 80, the output surfaces of image transport layers 80 may present an image over most or all of the exposed outwardly facing surface of device 10, including sidewall W and surfaces in the corners of device 10 and other portions of device 10 with compound curvature, while hiding components in interior 46 from view.

Figure 17:
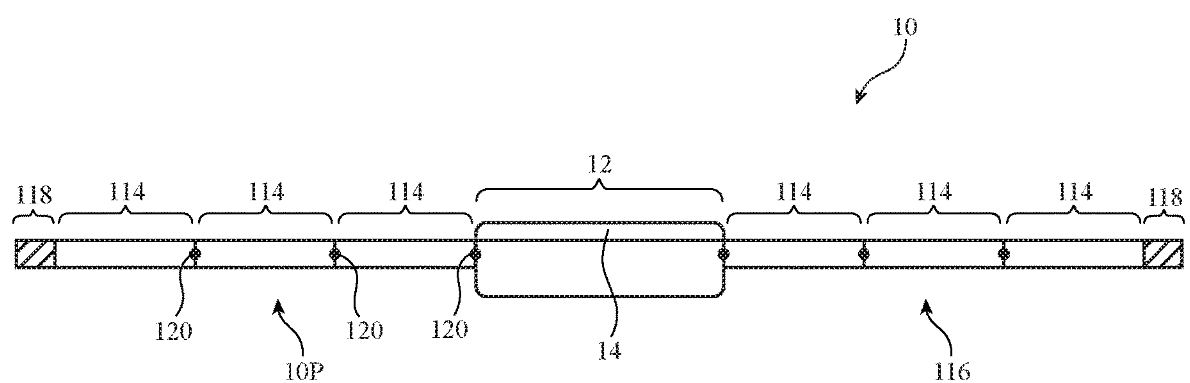
FIG. 17 is a cross-sectional side view of an illustrative wristwatch device in accordance with an embodiment.

If desired, image transport layers may be incorporated into wearable devices. As an example, consider device 10 of FIG. 17. As shown in the side view of device 10 of FIG. 17, device 10 may be a wristwatch device having a main portion such as main unit (control unit) 112 and a strap such as strap 116. Main portion 112 may have a housing that supports a display and other components such as control circuitry 20, communications circuitry 22, and input-output devices 24 of FIG. 1. Strap 116 may have a first portion coupled to one side of unit 112 (e.g., the housing of unit 112) and a second portion coupled to an opposing side of unit 112 (e.g., the opposing side of the housing of unit 112). Clasps 118 may be formed at the ends of the first and second portions, respectively. When strap 116 is wrapped around a user's wrist, clasps 118 may mate to secure device 10 to the user's wrist. Clasps 118 may be magnetic clasps, clasps formed from mating clasp mechanisms (e.g., tangs and holes), hook-and-loop fasteners, or other structures for closing strap 116 around a user's wrist or other body part.

Strap 116 may be flexible, which allows strap 116 to be wrapped around a user's wrist. For example, strap 116 may be formed from fabric, flexible polymer, leather, or other flexible materials, and/or strap 116 may have multiple hinged segments 114. Segments 114, which may sometimes be referred to as wristband segments, strap segments, or links, may be formed from rigid materials (glass, rigid polymer, metal, etc.) and/or may be formed from flexible materials (e.g., fabric, flexible polymer, etc.). Hinges 120 may be formed at joints between adjacent pair of segments 114 and between segments 114 and main unit 112. Hinges 120, which may be metal hinges, fabric hinges, hinges formed from polymer and/or metal or other materials, and/or other hinge structures, may be used to allow segments 114 to rotate with respect to each other and with respect to main unit 112. If desired, strap 116 may be detachable.

Main unit 112 may include a touch screen display, buttons, sensors, and/or other input-output devices 24 (e.g., integrated circuits and other components forming control circuitry 20, communications circuitry 22, and input-output devices 24 of FIG. 1). Flexible printed circuits, wires, metal traces formed on housing structures and other substrates in unit 112 and strap 116, and/or other signal path structures may be used to electrically couple circuitry in main unit 112 to optional circuitry in strap 116.

To provide a user of device 10 with visual output in desired locations (e.g., to display an image containing content such as text, graphics, and video), device 10 may include image transport layers 80. One or more image transport layers 80 may, as an example, be included in main unit 112 and may overlap one or more arrays of pixels associated with display 14 in main unit 112. If desired, strap 116 may also include one or more image transport layers 80. As shown in the cross-sectional side view of the illustrative portion of strap 116 of FIG. 18, each segment 114 of strap 116 may have a respective display layer 100 that is coupled to circuitry in main unit 112 using signal paths on flexible printed circuits or other signal path structures. The pixel array of each display layer 100 may generate an image that is received at the input surface of a corresponding image transport layer 80. The received image at the input surface of each layer 80 may be transported to a corresponding output surface for viewing by a user. The output surface of each layer 80 may serve as the exterior surface of strap 116 or each segment 114 of strap 116 may be provided with a rigid display cover layer (e.g., a polymer layer or glass layer, as described in connection with housing structures 12-1). The use of image transport layers 80 in segments 114 of strap 116 may allow these segments to have peripheral edges with curved cross-sectional profiles and inactive borders that are narrow or that are completely absent.

If desired, light sources such as light-emitting diodes may supply backlight illumination for a pixel array (e.g., a liquid crystal pixel array), illumination for a patterned ink layer (e.g., ink patterned into the shape of an icon), or other illumination. The light from multiple individually controlled light-emitting diodes or other light sources may be used to provide this illumination or this illumination may be provided by one or more light-emitting diodes or other light sources that are controlled in unison.

Figure 19:
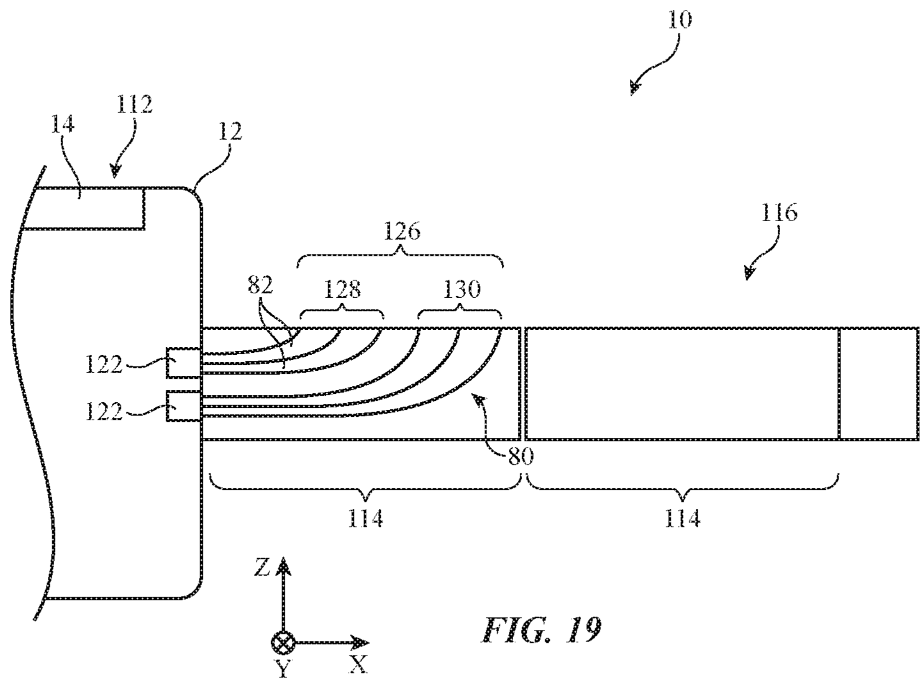
FIG. 19 is a cross-sectional side view of a portion of a wristwatch device and associated strap that has an image transport layer in accordance with an embodiment.

Consider, as an example, the cross-sectional side view of wristwatch device 10 of FIG. 19. As shown in FIG. 19, main unit 112 may have a housing such as housing 12 in which a display 14 has been mounted. Main unit 112 may include a light source with one or more light-emitting diodes such as light-emitting diodes 122. Each light-emitting diode 122 may supply light to a corresponding set of fibers 82 in image transport layer 80. Image transport layer 80 may be configured to route laterally emitted light in an outwards direction away from strap 116. For example, light from a first of light-emitting diodes 122 may be emitted into image transport layer 80 in direction X and may be routed by a first set of fibers 82 in image transport layer 80 in outwards direction Z, thereby creating light output on the output surface of image transport layer 80 in first region 128, whereas light from a second of light-emitting diodes 122 may be emitted into image transport layer 80 in direction X and may be routed by a second set of fibers 82 in image transport layer 80 in outwards (upwards) direction Z, thereby creating light output on the output surface of image transport layer 80 in second region 130.

Figure 20:
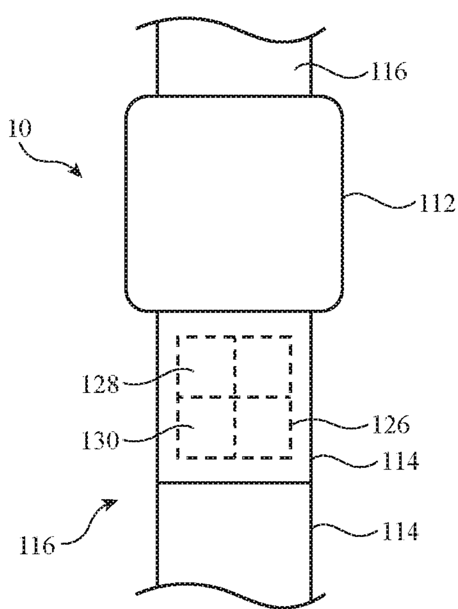
FIG. 20 is a top view of a wristwatch device of the type shown in FIG. 19 showing how visual output may be provided using an output surface associated with the image transport layer in accordance with an embodiment.

As shown in the top view of FIG. 20, the output surface of image transport layer 80 may have multiple separate areas that are illuminated in this way. Fibers 82 may be configured to from patterns (e.g., logos, icons associated with actions such as receiving a message, expiration of an alarm, battery charge status, power status, etc.). By selectively illuminating desired light-emitting diodes 122, corresponding desired patterns of the surface of strap 116 may be illuminated (e.g., to convey information to a user). For example, different icons can be illuminated, different portions of a pattern can be illuminated (e.g., a selected number of bars in a status bar indicator may be illuminated), an opening in an ink layer and/or colored transparent regions may be illuminated, etc. Light-emitting diodes 122 (or laser diodes or other light sources including light sources associated with pixels in an optional laterally oriented display in unit 112) may supply fibers 82 in image transport layer 80 with one or more different colors of light. Color adjustments, illumination timing adjustments, illumination pattern adjustments, and/or light intensity adjustments light flashing pattern adjustments, and/or light intensity adjustments may be used in conveying desired visual output to a user.

Figure 18:
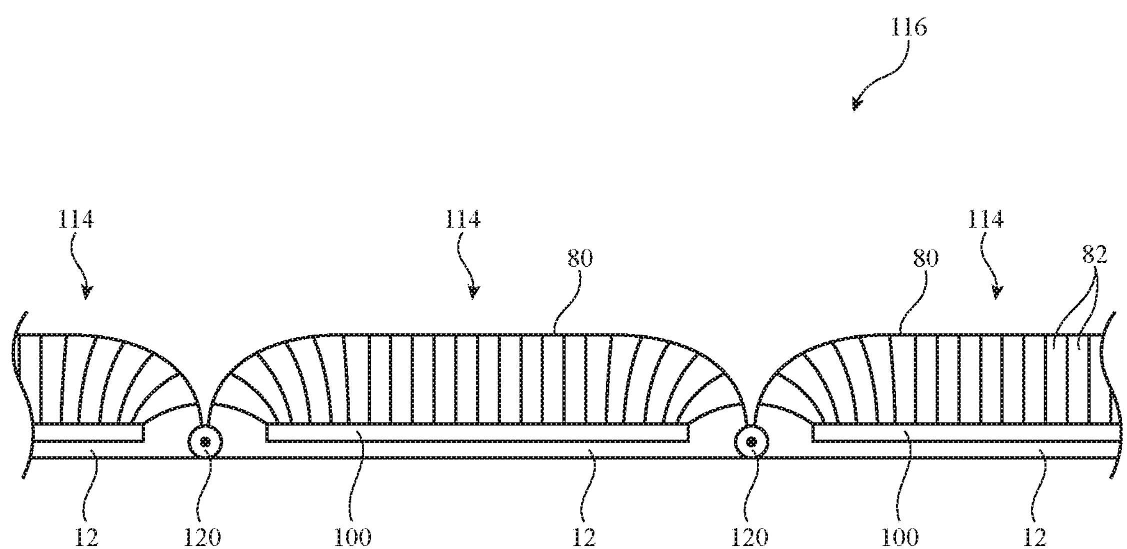
FIG. 18 is a cross-sectional side view of a portion of a wrist-watch strap showing how strap links may have image transport layers and displays in accordance with an embodiment.

In the example of FIGS. 19 and 20, image transport layer 80 has an input surface that faces main unit 112 to receive light output from light-emitting diodes 122 mounted in housing 12 of main unit 112. If desired, light sources such as light-emitting diodes 122 may be mounted within strap 116. The output surface of image transport layer 80 in FIG. 19 has a planar surface. As shown in FIG. 18, the output surface of image transport layer 80 may have a curved profile. Multiple segments 114 may receive light by configuring a respective image transport layer 80 in each segment to receive light from an adjacent image transport layer 80 in an adjacent segment 114. In this way, illumination may be distributed throughout strap 116. In some configurations, image transport layer 80 may provide backlight illumination (e.g., to an overlapping liquid crystal display having an array of pixels that are backlit by image transport layer 80). In this type of arrangement, light-emitting diodes 122 may be individually adjusted to provide local dimming of the backlight illumination.

Figure 21:
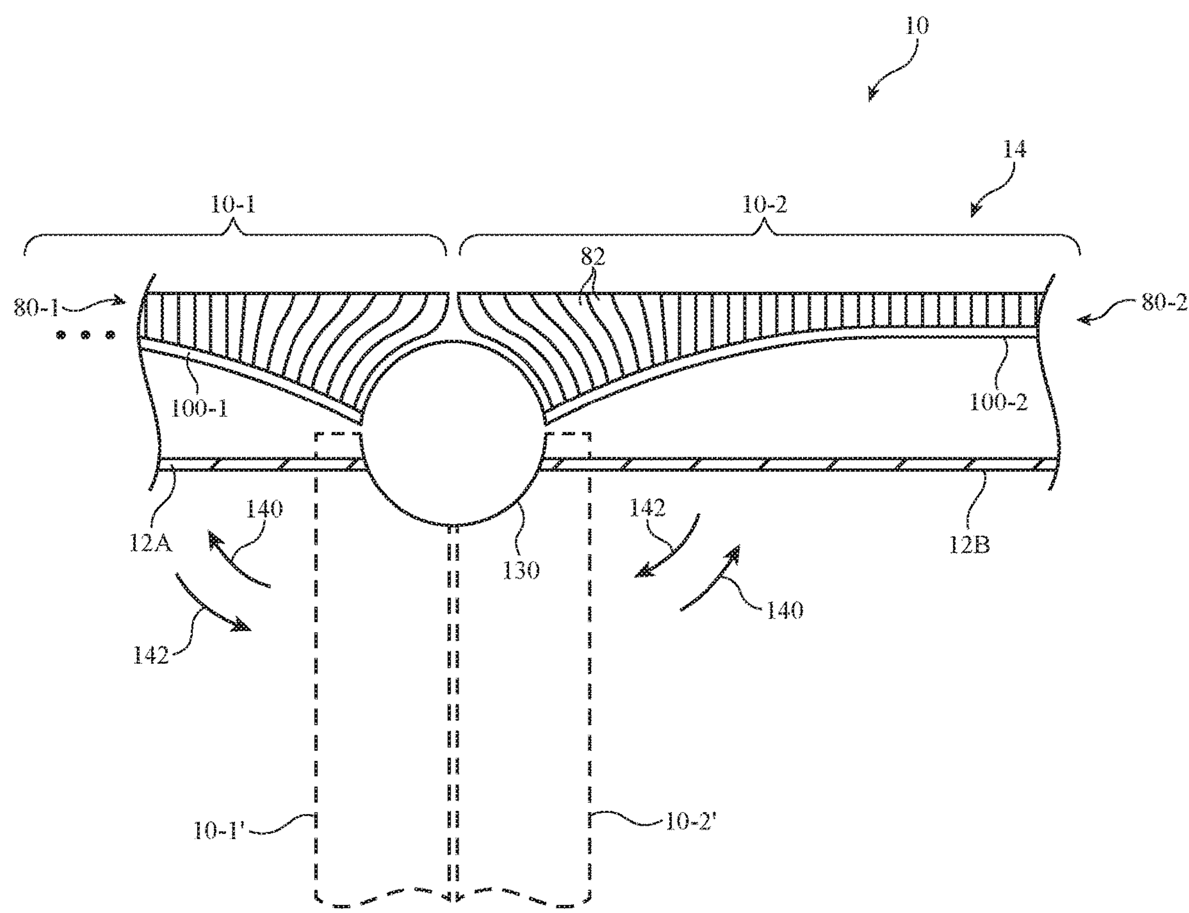
FIG. 21 is a cross-sectional side view of an illustrative folding device having image transport layer structures configured to hide a hinge from view when the folding device is in an unfolded configuration in accordance with an embodiment.

Another illustrative electronic device with image transport layer structures is shown in FIG. 21. In the example of FIG. 21, device 10 is a foldable device having a first portion 10-1 that is coupled to a second portion 10-2 with hinge 130. Hinge 130 allows first portion 10-1 to rotate relative to a second portion 10-2. Portion 10-1 may have first housing structures 12A that are coupled to hinge 130 and that support first display layer 100-1 and may have second housing structures 12B that are coupled to hinge 130 and that support second display layer 100-2. Display layers 100-1 and 100-2 may be planar and/or may have portions with curved profiles. For example, display layers 100-1 and 100-2 may be organic light-emitting diode display layers or other display layers with flexible substrates and bent edges.

Portion 10-1 may include image transport layer 80-1 and portion 10-2 may include image transport layer 80-2. Image transport layer 80-1 may have an input surface that receives an image from an array of pixels in display layer 100-1 and a corresponding output surface at which a transported version of the received image is viewed. Image transport layer 80-2 may similarly have an input surface that receives an image from an array of pixels in display layer 100-2 and a corresponding output surface at which a transported version of the received image is viewed. When it is desired to create a single unitary display for device 10, portions 10-1 and 10-2 may be rotated in directions 140 about hinge 130 until device 10 has the planar configuration shown in FIG. 21 (e.g., so that device 10 is in an unfolded configuration and the display layers on portions 10-1 and 10-2 form unified display 14). When it is desired to reduce the size of device 10, portion 10-1 and portion 10-2 may be rotated in directions 142 about hinge 130 (e.g., so that portions 10-1 and 10-2 are in locations 10-1' and 10-2', device 10 is in a folded configuration, and display layers 100-1 and 100-2 face in different directions by facing outwardly and away from each other). An optional transparent display cover layer may cover the output surfaces of image transport layers 80-1 and 80-2. Using an arrangement of the type shown in FIG. 21, fibers 82 of image transport layers 80-1 and 80-2 may be configured so that the output surfaces of image transport layers 80-1 and 80-2 overlap and hide hinge 130 from view when device 10 is in the unfolded (planar display) configuration (e.g., the top surface of device 10 of FIG. 21 may be covered with a seamless display).

Figure 22:
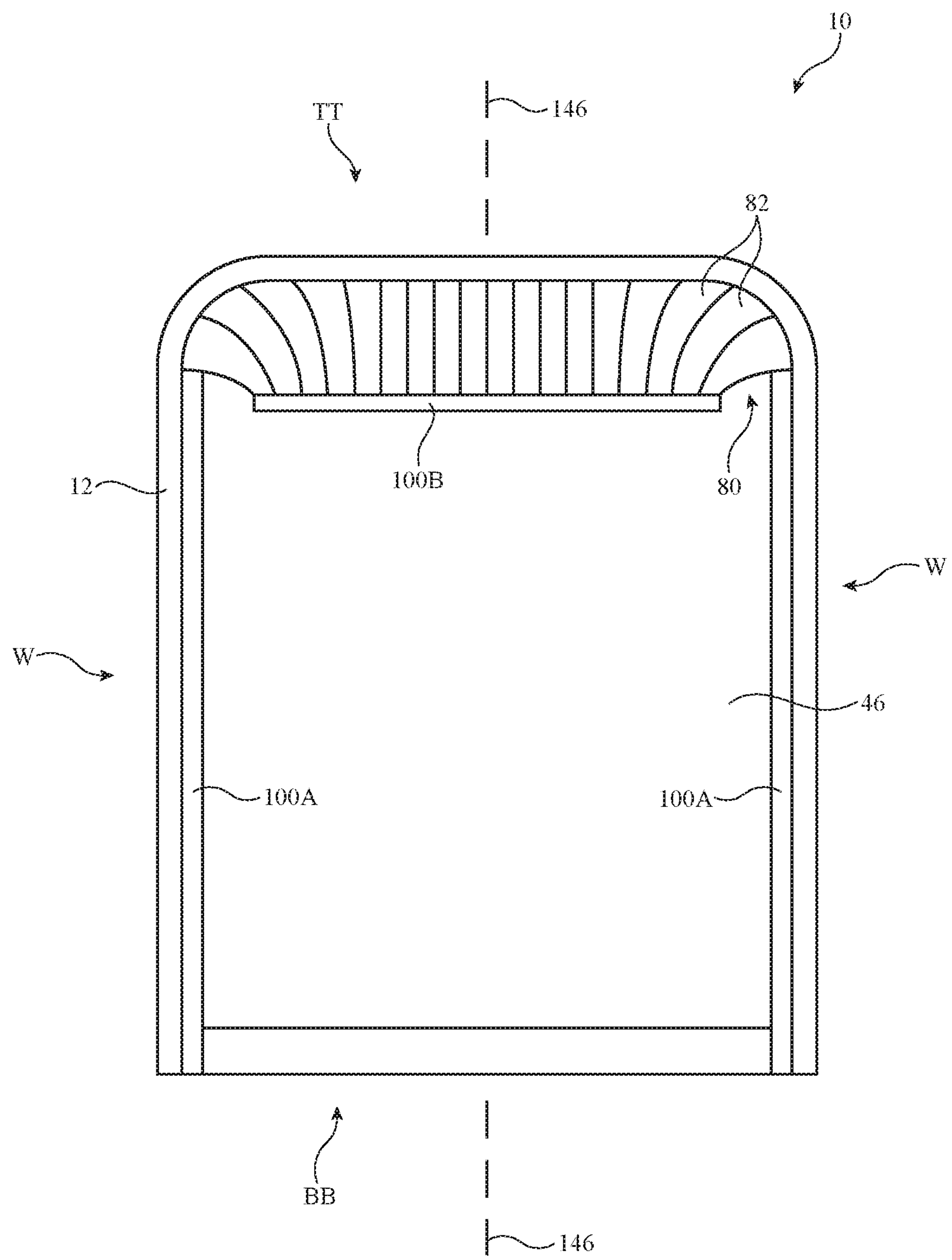
FIG. 22 is a cross-sectional side view of an illustrative device having an image transport layer that may create visual output that merges with visual output on a sidewall display in accordance with an embodiment.

Another illustrative configuration for device 10 is shown in FIG. 22. Device 10 of FIG. 22 may be a voice-controlled speaker (sometimes called a voice activated assistant) or other electronic device. In the illustrative configuration of FIG. 22, device 10 extends vertically along axis 146. Device 10 may, as an example, have a cylindrical shape and may be symmetric or nearly symmetric when rotated about axis 146. Surface BB of device 10 may rest on a supporting surface such as a table top. The sides of device 10 may be covered with housing 12 (e.g., fabric to allow sound to pass). Interior 46 may include speakers and other components (e.g., control circuitry 20, communications circuitry 22, and input-output devices 24 of FIG. 1).

Optional display layers such as display layer 100A may be wrapped around some or all of a cylindrical inner or outer surface associated with a layer of polymer or other supporting material (e.g., a housing structure). In the example of FIG. 22, display layer 100A is attached to the cylindrical inner surface of a transparent housing (housing 12). Other support arrangements may be used, if desired.

Housing 12 may have openings and/or transparent regions formed from polymer, glass, etc. so that an image on the pixel array of layer 100A may be viewed on the sidewalls W of device 10. Top surface TT may have a circular outline or other suitable outline when viewed from above along axis 146. Image transport layer 80 may have an input surface that receives an image displayed on display layer 100B and an output surface facing the exterior of device 10 to which the received image is transported through fibers 82. Image transport layer 80 may have a curved cross-sectional profile and may, if desired, be rotationally symmetric (e.g., image transport layer 80 and optional overlapping transparent portions of housing 12 at top surface TS may have a circular shape and may be rotationally symmetric about axis 146). Images may be displayed using the pixel array of layers 100A and 100B. Using this type of arrangement, some or all of the exposed surfaces of device 10 may be covered with still and/or moving image content (e.g., when bottom surface BB is resting on a table). The image that is displayed by display layer 100A and/or display layer 100B may include text such as song titles and other information related to audio content that is being presented to a user by speakers in interior 46. If desired, display layers 100A and/or 100B may be used to display visual content such as swirling light patterns that serve as feedback as a user interacts with device 10 using touch commands, voice commands, and/or other user input commands.

Figure 23:
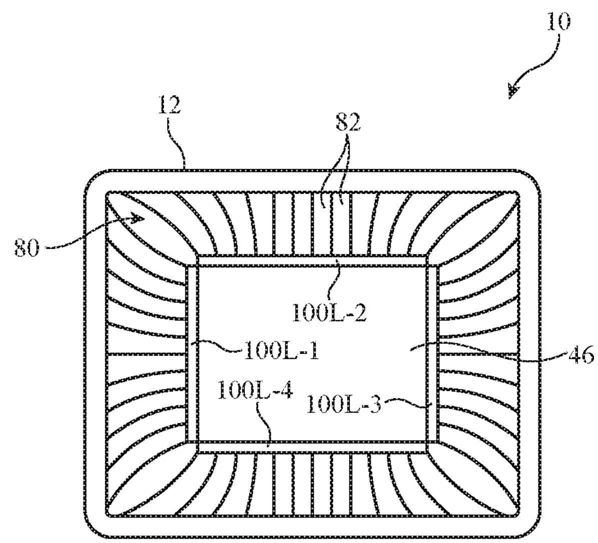
FIG. 23 is a cross-sectional view of an illustrative electronic device with image transport layer structures and displays that are oriented in different directions in accordance with an embodiment.

FIG. 23 is a cross-sectional side view of device 10 in an illustrative configuration in which device 10 has at least four display layers 100L-1, 100L-2, 100L-3, and 100L-4, each of which may include an array of pixels for displaying images and each of which may face in a different direction. A set of four corresponding image transport layers 80 may be used to cover the display layers. Each display layer may have a planar shape or other suitable shape and may be covered by a respective image transport layer. Each display layer and image transport layer may be covered and protected by an optional transparent housing 12. Device 10 may have a cube shape and may have pixel arrays on four, five, or six sides of the cube or may have other suitable shapes. Interior 46 of device 10 of FIG. 23 may include control circuitry 20, communications circuitry 22, and input-output devices 24 of FIG. 1.

Figure 24:
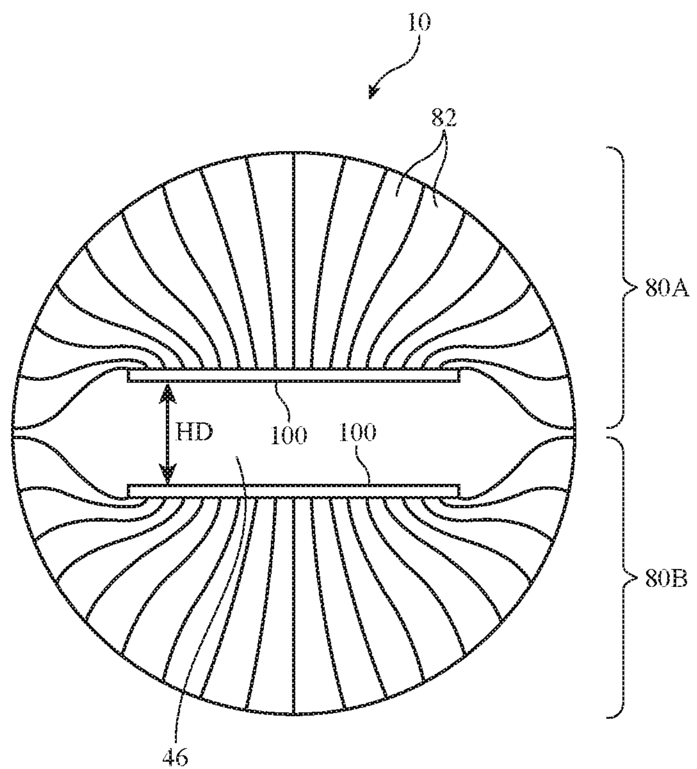
FIG. 24 is a cross-sectional side view of an illustrative electronic device with image transport layers having curved output surfaces in accordance with an embodiment.

In the example of FIG. 24, device 10 has a pair of display layers 100 that are separated by a distance HD to create interior 46 (e.g., to house control circuitry 20, communications circuitry 22, and input-output devices 24 of FIG. 1). Display layers 100 of FIG. 24 may face away from each other. One of display layers 100 may, for example, provide an image to the input surface of a first image transport layer 80A and another of display layers 100 may provide an image to the input surface of a second image transport layer 80B. Layers 80A and 80B may be hemispherical (and may therefore have surfaces of compound curvature) and may be joined together to form a spherical shape for device 10 and/or may have other suitable shapes (e.g., half cylinders, etc.). An optional display cover layer may cover the surface of device 10.

The display structures in device 10 may include capacitive touch sensors or other touch sensors that are configured to gather touch input. The touch input may be provided by a user's fingers or other external objects. These external objects may touch the surfaces of the image transport layers and/or the surfaces of the display cover layers of device 10. The touch sensors may be formed as part of the display layers and/or may be formed separately. Device 10 may incorporate one or more portions with cube shapes, spherical shapes, hemispherical shapes, cylindrical shapes, shapes with rounded corners, and/or other shapes. These shapes may, if desired, be used in combination with each other. (e.g., a hemisphere may be formed on top of a cylinder, etc.).

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device having a front, a rear, and sidewalls between the front and the rear, comprising:

a first pixel array that faces the front and displays a first image;

a second pixel array that faces the rear and displays a second image and that faces away from the first pixel array;

a first image transport layer having a first input surface and a first output surface at the front and a first portion of the sidewalls, wherein the first input surface receives the first image and wherein the first image is transported through the first image transport layer to the first output surface; and a second image transport layer having a second input surface and a second output surface at the rear and a second portion of the sidewalls, wherein the second input surface receives the second image and wherein the second image is transported through the second image transport layer to the second output surface.

2. The electronic device defined in claim 1, wherein the first and second output surfaces meet along the sidewalls.

3. The electronic device defined in claim 2 wherein the sidewalls have curved cross-sectional profiles.

4. The electronic device defined in claim 3 further comprising:

an integrated circuit located between the first and second pixel arrays.

5. The electronic device defined in claim 4 wherein the first and second pixel arrays comprise respective first and second flexible display layers with bent edges.

6. The electronic device defined in claim 5 wherein the first and second image transport layers comprise coherent fiber bundles.

7. The electronic device defined in claim 5 wherein the first and second image transport layers comprise Anderson localization material.

8. The electronic device defined in claim 4 wherein the integrated circuit comprises cellular telephone transceiver circuitry.

9. A wristwatch device, comprising:

a housing;

a light source in the housing;

a display in the housing; and a strap coupled to the housing, wherein the strap includes a plurality of links, each link having edges, curved portions at the edges, and a planar portion between the curved portions, at least one of the links includes a coherent fiber bundle having an input surface and an output surface, the coherent fiber bundle extends across the link and overlaps the curved portions and the planar portion, the light source is configured to emit light out of the housing and into the strap, and the light passes through the coherent fiber bundle from the input surface to the output surface.

10. The wristwatch device defined in claim 9 wherein the light source comprises a plurality of light-emitting diodes.

11. The wristwatch device defined in claim 9 wherein the strap comprises:

hinges, wherein the links are coupled together using the hinges.

12. The wristwatch device defined in claim 9 wherein the coherent fiber bundle has a curved cross-sectional profile.

13. A folding electronic device, comprising:

a hinge;

first and second housing portions that are coupled to the hinge and that rotate with respect to each other about the hinge;

first pixels that are supported by the first housing portion and that display a first image, wherein the first pixels have a first edge at a first side of the first housing portion and a second edge at a second side of the first housing portion;

second pixels that are supported by the second housing portion and that display a second image;

a first image transport layer having a first input surface and a first output surface, wherein the first input surface receives the first image, wherein the first image is transported through the first image transport layer to the first output surface, and wherein the first image transport layer comprises a plurality of coherent fiber bundles that overlap the first pixels from the first edge to the second edge; and a second image transport layer having a second input surface and a second output surface, wherein the second input surface receives the second image and wherein the second image is transported through the second image transport layer to the second output surface.

14. The folding electronic device defined in claim 13 wherein the first and second housing portions are configured to rotate about the hinge to an unfolded configuration in which the first and second pixels form a unitary planar display.

15. The folding electronic device defined in claim 14 wherein the first and second housing portions are configured to rotate to a folded configuration in which the first and second pixels face away from each other and display the first and second images in opposing directions.

16. The folding electronic device defined in claim 14 wherein, in the unfolded configuration, the first output surface has a first edge portion that overlaps a first part of the hinge, the second output surface has a second edge portion that overlaps a second part of the hinge, and wherein the first and second edge portions join to form the unitary planar display.

17. The folding electronic device defined in claim 13 wherein the first pixels form a first flexible display layer having a first bent edge portion along the hinge and wherein the second pixels form a second flexible display layer having a second bent edge portion along the hinge.

* * * * *